A. LATHAM.
BUTTON.
APPLICATION FILED OCT. 2, 1919.

1,388,471.

Patented Aug. 23, 1921.

INVENTOR
Albert Latham

UNITED STATES PATENT OFFICE.

ALBERT LATHAM, OF BEVERLY, MASSACHUSETTS, ASSIGNOR TO AMERICAN BUTTON & FASTENER CO., OF AUGUSTA, MAINE, A CORPORATION OF MAINE.

BUTTON.

1,388,471. Specification of Letters Patent. Patented Aug. 23, 1921.

Application filed October 2, 1919. Serial No. 327,937.

*To all whom it may concern:*

Be it known that I, ALBERT LATHAM, a citizen of the United States, residing at Beverly, in the county of Essex and State of Massachusetts, have invented certain Improvements in Buttons, of which the following description, in connection with the accompanying drawings, is a specification, like reference characters on the drawings indicating like parts in the several figures.

My invention relates to buttons, and more particularly those commonly made with a body portion, of some such substance as pearl, with which coöperate securing members, one, as the eye, being employed to fix the button in place in use, and the other, as the stud, to retain the eye in its position within the body. It is an object of the invention to arrange for the ready and very firm attachment to one another of such button elements without subjecting the frangible body to undue strain.

A feature of the invention consists in securing members formed with a coöperating projection and depression arranged for engagement by direct rectilinear movement and retained positively against separation by reverse movement to connect them to the body. Preferably, there are projections upon both securing members arranged in series and having their coöperation within the body of the button. In the form illustrated, there is an attaching member, or eye, with a shank portion, and a retaining member, or stud, these having similarly inclined serrations engaging one another in an opening in the body. This arrangement effects a positive locking of the securing members to one another and at a plurality of separated points, which well distributes the stresses which may be set up within the body.

A further feature of the invention concerns the relation between the engaging means of the securing members, there being oppositely placed internal and external projections coöperating within the body opening, the normal distance between the extremities of the internal projections being less than that between the external projections and one of said members being expansible within the body to admit the other. With this organization, a securing member, as the stud carrying the internal projections, may be forced by relatively slight pressure between the portions of the other securing member as the shank of the eye with its internal projections, but reverse or disengaging movement is prevented even under extreme tension. This action of admitting one element within the other and yet retaining them against separation is made more effective by forming the projections as serrations, the similarly inclined walls of which slide over one another when the elements are assembled; while the walls connecting the inclines prevent, by their contact, movement in the opposite direction.

The above and other features are hereinafter described in greater detail, reference being had to the accompanying drawing, in which—

Figure 1:
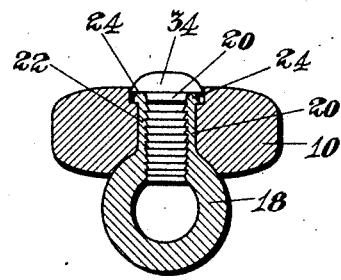
Figure 1 is a central section through one embodiment of my invention.
Figure 2:
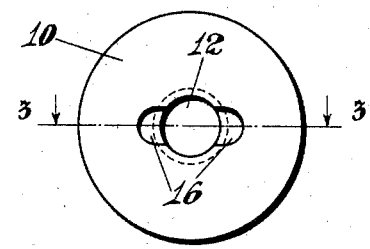
Fig. 2 is a bottom plan view of the body of the button.
Figure 3:
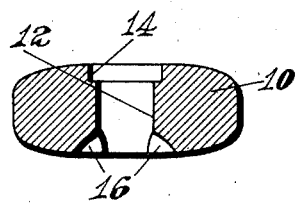
Fig. 3 is a transverse section on the line 3—3 of Fig. 2.
Figure 5:
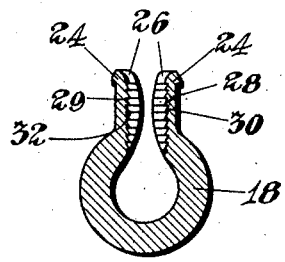
Fig. 5 is a section on the line 5—5 of Fig. 4.
Figures 4, 6:
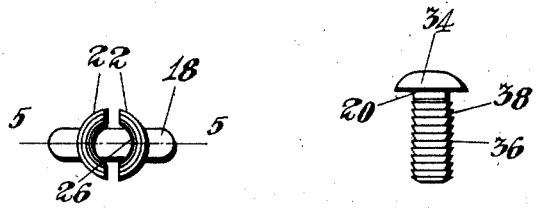
Fig. 4 is a top plan view of the eye.
Fig. 6 illustrates the stud in side elevation.

At 10 the head or body portion of my improved button appears, it being of any desired form, as a disk rounded at the edges and being cut from pearl or other suitable material, or molded or cast in a plastic substance or in metal. The body has an axial opening 12, surrounding one extremity of which, preferably concentrically, is an annular recess 14. At the opposite side of the body, a groove 16 extends from the opening partly across the bottom wall. Within the opening coöperate two metal securing elements, consisting of an eye or attaching member 18 and a stud or retaining member 20, these entering the opening 12 from opposite sides of the body. The main or external portion of the eye 18 is seated in and held against rotation by the grooves 16, while separate shank portions 22, 22 lie along the walls of the opening and have angular extremities 24 extending oppositely in the recess 14. In the adjacent sides of the shank portions are longitudinal depressions 26, preferably partly circular in transverse section. In the walls of these depressions are series of transverse projections 28 with intermediate depressions 29, the projections being best in the form of serrations having inclined walls 30 converging toward the body of the eye, and connecting walls 32 between the inclined walls, these connecting walls extending substantially at right angles to the axis of the shank portions. The projections and depressions lie side by side circumferentially of their members in parallel planes. The stud 20 has a head 34 of such diameter as to be received in the recess 14. The body portion of the stud is provided with a peripheral series of projections 36 corresponding to those upon the shank portions, they preferably having the same dimensions, and with their walls 38 inclined in the same direction as the shank walls 30. That is, when the securing members are in coöperation, the walls 38 converge from the head 34 toward the eye 18. The diameter of the body of the stud between the extremities of its external projections 36 is somewhat greater than the normal distance between the inner extremities of the internal projections 28 upon the shank portions, this last-mentioned dimension being taken when the shank is in place in the opening 12 of the body 10, so that it is backed and supported by the body.

In assembling the elements of the button, the shank portions of the eye are inserted in the opening 12, with the main portion resting in and retained against turning by the groove 16, the angular ends 24 being received within the recess 14, they hooking over its bottom wall. The stud is then forced between the shank portions, the slight yield distributed between the metal of the two securing members and that also permitted by the body of the button allowing this to be done without danger of breaking the body. If desired, support may be afforded the latter by clamps bearing against its opposite edges. When the stud has reached a point at which the under side of the head contacts with the ends 24 of the shank portions, the serrations of the stud rest within depressions between the serrations of the shank portions, and, while by no means filling them, there is, without further pressure being exerted, a positive engagement between the connecting surfaces 32 of the serrations resisting withdrawal of the stud. Further pressure, however, is applied to the head 34, it being resisted by an anvil introduced through the eye and upon which the inner end of the stud bears. This is sufficient to expand the body of the stud until its serrations are forced into intimate association with the shank depressions, the flow of the metal of the stud causing the depressions to be substantially filled. Simultaneously the under side of the head is pressed against the extremities 24 of the shank portions, so they are still further turned into the recess 14. This pressure necessary to cause the stud to fill the space between the shanks and to hold the shank ends against the bottom wall of the recess is comparatively slight and well within that which would endanger the body of the button. The securing members are now locked fast to one another and to the body, so that they will resist much greater separating stresses than such devices are ever subjected to in use.

In my copending applications filed February 19, 1919, Serial No. 277,931, and March 10, 1919, Serial No. 281,836, other species of button are described and more broadly claimed.

Having described my invention, what I claim as new and desire to secure by Letters Patent of the United States is:

1. A button comprising a body, and securing members formed with a projection and depression arranged for engagement by direct rectilinear movement and retained positively against separation by reverse movement to connect the members to the body.

2. A button comprising a body, an attaching member having a shank portion, and a retaining member, said shank portion and retaining member being formed with a projection and a depression each provided with a wall inclined to the axes of the shank and retaining member and a wall extending substantially at right angles thereto, the last-mentioned walls coöperating to secure the parts together when they are assembled.

3. A button comprising a body, and securing members each formed with a series of projections coöperating with one another in the body.

4. A button comprising a body, an attaching member having a shank portion, and a retaining member, said shank portion and retaining member being formed with coöperating series of projections.

5. A button comprising a body, an attaching member, and a retaining member, said members being formed with similarly inclined serrations and one of the members being arranged to yield laterally to permit retaining engagement with the other within the body.

6. A button comprising a body, an eye having a serrated shank portion, the serrations of each member extending circumferentially in parallel planes, and a stud serrated for engaging the serrations of the shank portion.

7. A button comprising a body formed with an opening, an eye having separated shank portions situated in the opening, there being depressions at the inner sides of the shank portions and projections extending laterally of said portions, and a stud lying within the shank depressions and having projections engaging the shank projections.

8. A button comprising a body formed with an opening, an eye having separated shank portions situated in the opening, there being depressions at the inner sides of the shank portions and serrations extending laterally of said portions, and a stud lying within the shank depressions and having similarly inclined serrations engaging the shank serrations.

9. A button comprising a body having an opening, and members formed respectively with oppositely placed internal and external projections for coöperation within the opening, the normal distance between the extremities of the internal projections being less than that between the external projections and one of said members being expansible within the body to admit the other.

10. A button comprising a body having an opening, and members formed respectively with oppositely placed and similarly inclined series of internal and external serrations, each of which serrations is independent of those associated with it in the series, the distance between the points of the internal serrations when their member is in place in the body being less than the distance between the points of the external serrations.

11. A button comprising a body having an opening, and members formed respectively with oppositely placed internal and external projections for coöperation within the opening, the normal distance between the extremities of the internal projections being less than that between the external projections, the coöperating projections being forced into intimate contact by expansion of the internal member.

12. A button comprising a body formed with an opening, an eye having separated shank portions situated in the opening and being held against separation by the walls thereof, the shank ends extending over the body near the end of the opening and there being transverse serrations at the inner sides of the shank portions, and a stud entering between the shank portions and having peripheral serrations engaging those of the shank, the diameter of the stud at the points of these serrations being greater than the distance between the points of the shank serrations.

13. A button comprising a body provided with an opening and a recess surrounding the opening, an attaching member having a serrated shank portion situated in the opening and an angular extension lying within the recess, and a retaining member having a head contacting with the extremity of the shank portion and serrations coöperating with those of said shank portion.

14. A button comprising a body provided with an opening and a recess surrounding the opening, an eye having separated shank portions situated in the opening with oppositely extending angular extremities lying within the recess, there being transverse serrations at the adjacent sides of the shank portions, and a stud having a head contacting with the extremities of the shank portions and peripheral serrations coöperating with those of said shank portions.

In testimony whereof I have signed my name to this specification.

ALBERT LATHAM.

It is hereby certified that in Letters Patent No. 1,388,471, granted August 23, 1921, upon the application of Albert Latham, of Beverly, Massachusetts, for an improvement in "Buttons," an error appears in the printed specification requiring correction as follows: Page 2, lines 116 to 118, claim 6, strike out the comma and words ", the serrations of each member extending circumferentially in parallel planes" and insert the same to follow the word "portion," line 120; and that the said Letters Patent should be read with this correction therein that the same may conform to the record of the case in the Patent Office.

Signed and sealed this 15th day of November, A. D., 1921.

[SEAL.]
KARL FENNING,
*Acting Commissioner of Patents.*